United States Patent [19]

Terhune et al.

[11] Patent Number: 4,871,455
[45] Date of Patent: Oct. 3, 1989

[54] FILTER ASSEMBLY WITH LOCKABLE LUG MEANS

[75] Inventors: Ralph D. Terhune, Broken Arrow, Okla.; James D. Murphy, London, England

[73] Assignee: Facet Enterprises, Inc., Tulsa, Okla.

[21] Appl. No.: 870,237

[22] Filed: Jun. 3, 1986

[51] Int. Cl.$^4$ .............................................. B01D 27/08
[52] U.S. Cl. .................................... 210/232; 210/238; 210/416.4; 210/DIG. 5; 210/DIG. 17; 55/506; 55/507
[58] Field of Search ............ 210/232, 231, 238, 416.4, 210/D5, D17; 55/506, 507

[56] References Cited

U.S. PATENT DOCUMENTS

| | | | |
|---|---|---|---|
| 3,160,000 | 12/1964 | Masher | 210/232 |
| 3,272,340 | 9/1966 | Hungerford, Jr. | 210/232 |
| 3,458,050 | 7/1969 | Cooper | 210/493.2 |
| 3,490,594 | 1/1970 | Hutchins, Jr. | 210/232 |
| 4,052,307 | 10/1977 | Humbert, Jr. | 210/D17 |
| 4,320,005 | 3/1982 | De Graffenreid | 210/232 |
| 4,588,503 | 5/1986 | Sugiera | 210/232 |

Primary Examiner—Richard V. Fisher
Assistant Examiner—Wanda L. Millard
Attorney, Agent, or Firm—Fish & Richardson

[57] ABSTRACT

A filter assembly including a base for supporting and providing fluid connection to a removable filter cartridge, the base having a hollow connecting ends for mating with the cartridge, a removable filter cartridge comprising a filter medium and having a connecting end shape to mate coaxially with the end of the base in a rotatable, telescopic relationship, the connecting end of one of the base and the cartridge having lug means extending radially toward the end of the other, the other connecting end having corresponding passage means for lockably receiving the lug means, the telescopically related mating ends of the base and cartridge providing radially opposed surfaces of circular cross-section about the mutual axis of the connecting ends of the base and cartridge, and a circular elastomeric sealing ring providing a radial seal between the circular cross-section surfaces, preventing liquid flow past it between the telescopic ends. Also disclosed are a spring locking mechanism to bias the lug means into locked position, and a filter cartridge having its filter medium both mechanically and adhesively secured to its connecting end member.

14 Claims, 4 Drawing Sheets

FILTER ASSEMBLY WITH LOCKABLE LUG MEANS

BACKGROUND OF THE INVENTION

The invention relates to filter assemblies, e.g., those used to filter aviation fuel.

Filters used to remove impurities from aviation fuel and to cause water in the fuel to coalesce into large drops that can settle and be removed by a sump pump are often sealably mounted over inlet openings in the bottom or side walls of fuel tanks or pressurized vessels through which the fuel flows immediately prior to discharge, such that liquid must pass through the filter before it enters the tank or vessel. These filters are often cylindrical and have an axial opening at the bottom and a tubular filter medium wall through which there is so-called inside-out flow. Similarly shaped filters can be mounted over outlets, in which case there would be outside-in flow.

These cylindrical filters have typically been secured by mating a threaded lower end of a filter cartridge base with a threaded opening in the floor of the tank or vessel or by sliding the filter over a floor-mounted threaded rod and holding it in place with a nut at the top of the filter. If the filters are overtightened, the threads may become worn, and the filters hard to remove. If the filters are undertightened, the filter may not seal well and may even be loosened by vibrations.

SUMMARY OF THE INVENTION

In one aspect, the invention features in general a filter assembly comprising a base for supporting and providing fluid connection to a removable filter cartridge, the base having a hollow connecting end for mating with the cartridge, a removable filter cartridge comprising a filter medium and having a connecting end shaped to mate coaxially with the end of the base in a rotatable, telescopic relationship, the connecting end of one of the base and the cartridge having lug means extending radially toward the end of the other, the other connecting end having corresponding passage means for lockably receiving the lug means, the telescopically related mating ends of the base and cartridge providing radially opposed surfaces of circular cross-section about the mutual axis of the connecting ends of the base and cartridge, and a circular elastomeric sealing ring providing a radial seal between the circular cross-section surfaces, preventing liquid flow past it between the telescopic ends.

In preferred embodiments one connecting end has an annular groove, and the ring is mounted in this groove; the groove is in the cylindrical surface of the filter cartridge; the cartridge is constructed from non-metallic material; the cartridge is completely made of material that can be incinerated; the cartridge includes static dissipative material; the filter medium includes a pleated filter on the inside of the support and layers on the outside of the support; the filter cartridge has a handle at its top permitting rotation and connection or removal of the cartridge; and the handle is rotatable between an upright position and a horizontal position.

In another aspect, the invention features in general a filter assembly comprising a base for supporting and providing fluid connection to a removable filter cartridge, the base having a hollow connecting end for mating with the cartridge, a removable filter cartridge comprising a filter medium and having a connecting end shaped to mate coaxially with the end of the base in a rotatable, telescopic relationship, the connecting end of one of the base and the cartridge being provided with lug means extending radially toward the end of the other, the other of the connecting ends having corresponding passage means for lockably receiving the lug means, the passage means extending along a circumferential path to an angular position and in an axial direction from the circumferential path at the angular position to a locked position in which the lug means is prevented from circumferential movement, and a locking mechanism biasing the lugs in the axial direction into the locked position, whereby the cartridge can be easily secured to the base and removed from the base, and unintended disconnection of the cartridge from the base owing to vibration is avoided.

In preferred embodiments lug means extend from the cartridge, and the passage means are located in the base; the base is provided with struts tranversing the fluid passage; and the locking mechanism is a spring (most preferably a wave spring).

In a third aspect, the invention features in general a filter cartridge assembly comprising a connecting end member having a fluid flow passage therethrough and an annular channel surrounding the passage, a filter medium support including a circular end received in the channel, means for mechanically locking the support to the connecting end member, a filter medium supported by the support and having an end received in the channel, and adhesive in the annular channel securing the end member, the filter medium support and the filter medium and sealably securing the filter medium to the end member.

In preferred embodiments the means for mechanically locking comprises wedge means applied to the connecting end member, and corresponding slot means on the support to receive the wedge means; the connecting member and the support are constructed from structural plastic; the slots are provided on a flat ring having a flow passage therethrough; the filter assembly further comprises a second filter medium and support mechanically and adhesively connected through a sealing member with annular channels to the first support.

The invention provides a filter cartridge which is quickly and easily connected to a permanently mounted base in a tank or vessel. Vibrations will not cause the filter to lose fluid tight contact with the base. Further, the invention features a filter cartridge which is more readily constructed than prior filters, and can be advantageously disposed of by incineration after usage, as there are no metal parts.

Other features and advantages of the invention will be understood from the following description of a presently preferred embodiment, and from the claims.

DESCRIPTION OF THE PREFERRED EMBODIMENT

The figures will be briefly described first.

Drawings

STRUCTURE

Figure 1:
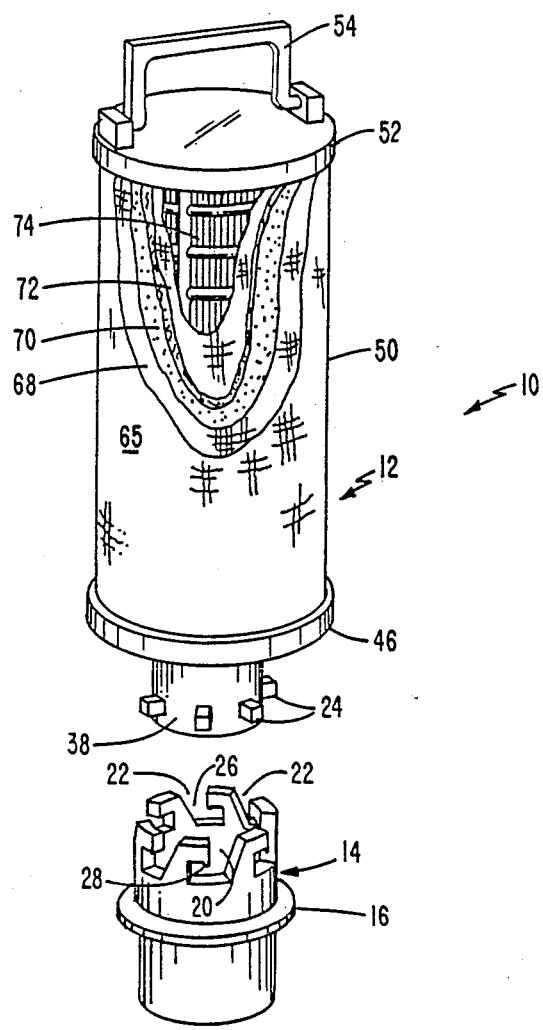
FIG. 1 is a diagrammatic perspective view, partially broken away, of a filter base and a mating removable filter cartridge according to the invention.
Figure 2:
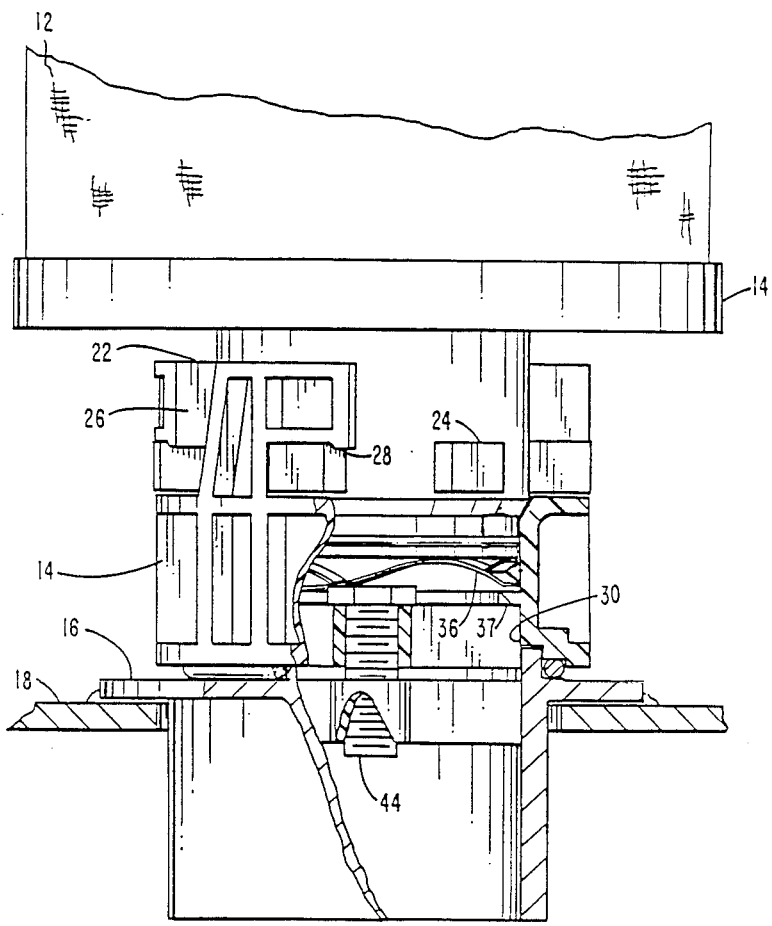
FIG. 2 is a partial elevation, partly broken away, showing the FIG. 1 base and cartridge lockably connected together.

Referring to FIGS. 1 and 2, filter assembly 10 includes removable filter cartridge 12 and plastic adapter base 14 mounted on metal stool 16, welded to fuel tank wall 18, so that fluid entering or leaving the tank must pass through stool 16 and base 14.

Base 14 has a series of locking passages 22 for mating with lugs 24 on filter cartridge 12. Each passage 22 extends along an entrance 26 to a horizontal circumferential path ending at an angular position, and then extends axially upward slightly to a locked position circumferentially adjacent to locking tab 28, which prevents rotational movement of lug 24 within passage 22 when lug 24 is urged upward into the locked position.

Figure 3:
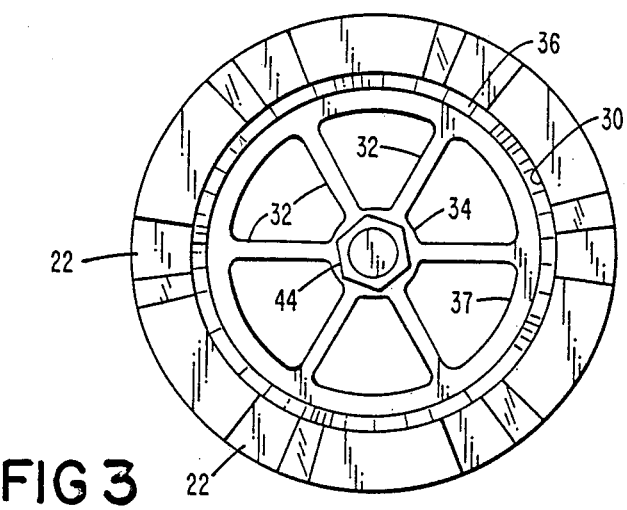
FIG. 3 is a plan view of the FIG. 1 base.

Base 14 has a cylindrical surface 30 defining a fluid passage and is provided with struts 32, shown in FIG. 3, which extend radially from hub 34 to surface 30. Lip 37, directly on top of struts 32, supports wave spring 36 against which filter cartridge 12 is applied. Wave spring 36 is made of 0.030" thick, ¼" wide, 316 stainless steel, making about 3 complete coils and bent to provide 3½ peaks per 360°. The free height of spring 36 is ¾", and it takes between 25 and 35 lb. force to push spring 36 down to its ¼" compressed height.

Figure 2A:
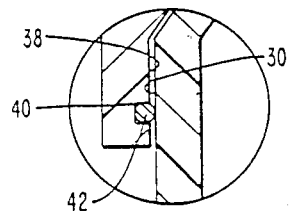
FIG. 2a is an enlarged partial sectional view showing mating portions of the FIG. 1 base and cartridge when connected together as in FIG. 2.

Referring to the enlarged portion of FIG. 2a. Cartridge 12 includes lower cylindrical surface 38, telescopically received in and facing surface 30 of base 14. Surface 38 includes annular recess 40 in which elastomeric sealing O-ring 42 is retained. O-ring 42 serves to tightly seal cartridge 12 and base 14 together, regardless of application of any axial force, as with gaskets. Surface 30 is 3.000"+0.002"−0.000" in diameter; surface 38 is 2.997"+0.000"−0.001" in diameter; groove 40 is 2.778"+0.000"−0.002" in diameter and 0.190"+0.002"−0.003" wide, and O-ring 42 (industry designation 2-232) has a 2.734" inner diameter and a 0.139"+0.004"−0.004" cross section. Base 14 is connected to the stool 16 of base 12 by bolt 44.

Figure 4:
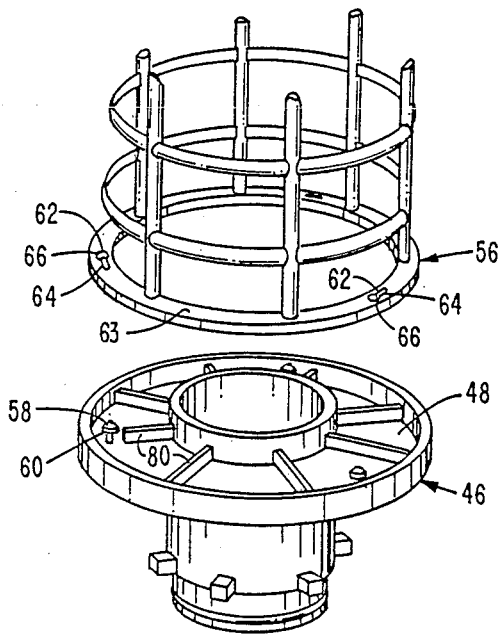
FIG. 4 is an exploded pespective view of a connecting end member and filter medium support of the FIG. 1 cartridge.

Referring to FIGS. 1 and 4, filter cartridge 12 includes connecting end member 46 with annular channel 48 into which the lower end of tubular filter medium 50 is sealably connected. The other end of filter medium 50 is similarly connected in a channel (not shown) in cap 52, provided with a pivotally mounted handle 54. Medium 50 includes a series of layers supported by plastic framed support 56. These include outer cotton fabric sock 65, 2" helical overlapping wrap of plastic screen 68, ¼" thick layer 70 of fiberglass thereunder, sheet of plastic screen 72 thereunder wrapped around ribs and columns of framed support 56, and pleated filter medium 74 on the inside of support 56. Pleated filter medium 74 is approximately ⅝" in overall radial dimension, the inner portion at the bottom fitting within annular channel 48.

Referring to FIG. 4, connecting end member 46 is provided with three axial pins 58 with oversized heads 60. Oversized heads 60 are designed to fit into slots 62 of lower flat ring 63. Slots 62 consist of circular openings 66, larger in diameter than the heads 60 of pins 58, and elongated portions 64, narrower than heads 60 of pins 58. In the finished cartridge 14, pins 58 are in narrow elongated portions 64, mechanically locking support 56 to end member 46 by wedging ring 63 against radial ribs 80.

Base 14, connecting end member 46 and frame 56 are made of structural plastic (available under the trade designation Valox from G.E., 15% glass filled).

Filter cartridge 12 is manufactured by inserting the lower end of filter components 65, 68, 70, 72, 74 and support 56 into annular groove 48 (already containing exothermic adhesive), mechanically locking support 56 to end member 46 using pins 58 and slots 64, and letting the adhesive set. The position of heads 60, the thickness of ring 63 and the height of radial ribs 80 are such that rotation of support 50 is against frictional forces acting to wedge support 56 in place. In a similar manner the other end of the filter cartridge is connected to top cap 52, shown in FIG. 1. Thus, both mechanical locking and chemical support are used to connect members together, more securely than prior use of adhesive alone.

Use

Filter cartridge 12 can be readily inserted into a fixed adapter base 14 by positioning the cartridge over the base as shown in FIG. 1. Lugs 24 of the cartridge are inserted into passages 22 of the base and pushed down using handle 54. The cartridge is then pushed against wavespring 36, rotated to the end of the circumferential portion of the passage, and released, wavespring 36 urging lugs 24 into locked positioned next to tabs 28. In this way filter cartridge 14 is securely fixed to base 12 and cannot be loosened by mere vibrational forces. The forces resulting from pressure difference inside and outside of cartridge 12 act upward, the same direction as the spring, reinforcing the locking. In the locked position fluid passing through base 12 must pass through filter cartridge 12 and thus through medium 50, as sealing O-ring 42 prevents liquid flow around the bottom of connecting end 46. The seal provided by O-ring 42 advantageously is not dependent on axial forces, as flat gaskets are. Filter medium 50 prevents solid particles from entering the tank and also cause coalescence of water within the fuel entering the tank, so that, upon leaving the filter, the water is in the form of large droplets that settle to the bottom of the tank, where they are removed by a sump pump or other means.

Removal of the cartridge is accomplished by pushing down on cartridge 12, using handle 54, and rotating the assembly such that lugs 24 are moved to entrances 26. The cartridge can then be pulled from the base, and then quickly be replaced by a second cartridge inserted into base 14, the entire changeover taking a matter of seconds, which is particularly significant when replacing a large number of filter cartridges at one time. Since the entire cartridge is constructed of combustible material, the removed cartridge can be incinerated and readily disposed of.

Other Embodiments

Other embodiments are within the scope of the following claims.

Figure 5:
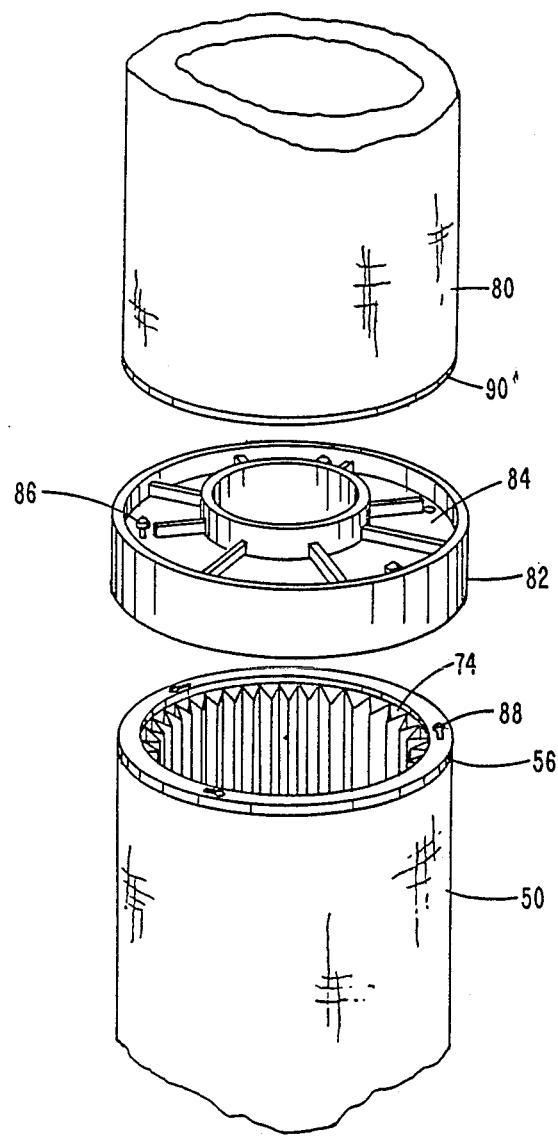
FIG. 5 is an exploded perspective view of a portion of an alternative embodiment of the FIG. 1 cartridge.

For example, in FIG. 5, further filter medium 80 is shown prior to connection sealing member 82, including two annular channels 84 with locking pins 86 for connection to slots 88 on framed support 56 of lower medium 50 and framed support 90 of further medium 80. A cap 52 and handle 54 (not shown) are attached to the top of support 90 and medium 80. The overall cartridge thus has twice the filtering and coalescing capacity of single stage filter cartridge 12.

What is claimed is:

1. A filter/coalescer assembly for mounting in a fuel tank comprising a base for supporting and providing fluid connection to a removable filter cartridge, said base being adapted for mounting at a port of said fuel tank and having a hollow connecting end for mating with said cartridge, a removable filter cartridge comprising a cylindrical filter medium and having a connecting end shaped to mate coaxially with said end of said base in a rotatable, telescopic relationship, said filter medium being adapted for inside-out flow, thereby causing said cartridge to be biased away from said base in use, said filter medium including material causing coalescing of water in fuel passing through said medium, the telescopically related mating ends of said base and cartridge providing radially opposed surfaces of circular cross section about the mutual axis of the connecting ends of said base and cartridge, the connecting end of one of said base and said cartridge having lug means extending radially toward the end of the other, the other said connecting end having corresponding passage means for lockably receiving said lug means, said passage means extending in a first circumferential direction along a first circumferential path at a first axial position to an angular position and in an axial direction from said first circumferential path at said angular position to a locked position at a second axial position that is different from said first axial position, there being a stop member at a position along a second circumferential path at said second axial position such that said lug means is prevented from circumferential movement along said second circumferential path in a second circumferential direction opposite to said first circumferential direction, a circular elastomeric sealing ring providing a radial seal between said circular cross-section surfaces, preventing liquid flow past it between said telescopic ends, and a locking mechanism biasing said lug means relative to said passage means in said axial direction into said locked position, said biasing being in the direction to cause said cartridge to be biased away from said base, whereby said cartridge can be easily secured to said base and removed from said base, and unintended disconnection of said cartridge from said base owing to vibration is avoided.

2. The filter/coalescer assembly of claim 1 wherein said lug means extend from said cartridge, and said passage means is located in said base.

3. The filter/coalescer assembly of claim 1 wherein said base includes struts tranversing a fluid passage of said base, said struts joining at a central hub having a hole therethrough for receiving a member for connecting said base to a vessel wall.

4. The filter/coalescer assembly of claim 1 wherein said locking mechanism is a spring.

5. The filter/coalescer assembly of claim 4 wherein said spring is a wave spring that completely surrounds a flow passage through said base and has portions at different axial positions.

6. The filter/coalescer assembly of claim 1 wherein one said connecting end has an annular groove in a radially opposed surface, and said ring is mounted in said groove and has an inner diameter smaller than the diameters of said opposed surfaces and an outer diameter larger than the diameters of said opposed surfaces.

7. The filter/coalescer assembly of claim 1 wherein one said connecting end has an annular groove in a radially opposed surface, and said ring is mounted in said groove and has an inner diameter smaller than the diameters of said opposed surfaces and an outer diameter larger than the diameters of said opposed surfaces, and wherein said groove is in said cartridge.

8. The filter/coalescer assembly of claim 1 wherein said filter cartridge has a handle at its top permitting rotation and connection or removal of said cartridge.

9. The filter/coalescer assembly of claim 1 wherein said filter cartridge has a handle at its top permitting rotation and connection or removal of said cartridge, and said handle is rotatable between an upright position and a horizontal position.

10. The filter/coalescer assembly of claim 1 wherein said cartridge is constructed from nonmetals.

11. The filter/coalescer assembly of claim 1 wherein said cartridge is completely made of material that can be incinerated, and includes structural plastic.

12. The filter/coalescer assembly of claim 1 wherein said cartridge is made of nonmetals, can be incinerated, and includes structural plastic and static dissipative material.

13. The filter/coalescer assembly of claim 1 wherein said cartridge includes two filter medium sections.

14. The filter/coalescer assembly of claim 1 wherein said base has a diameter between 5 and 6 inches.

* * * * *